UNITED STATES PATENT OFFICE.

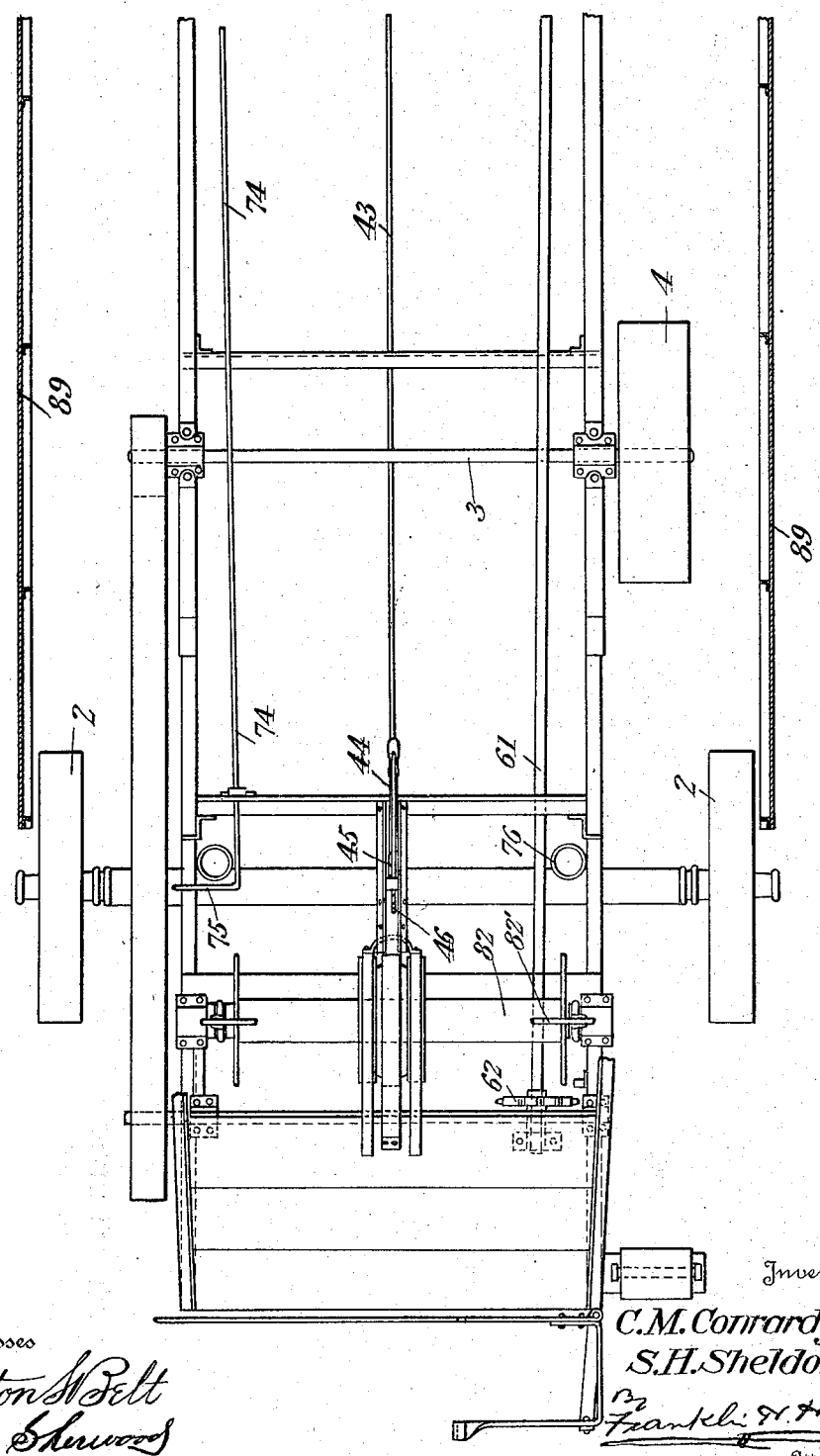

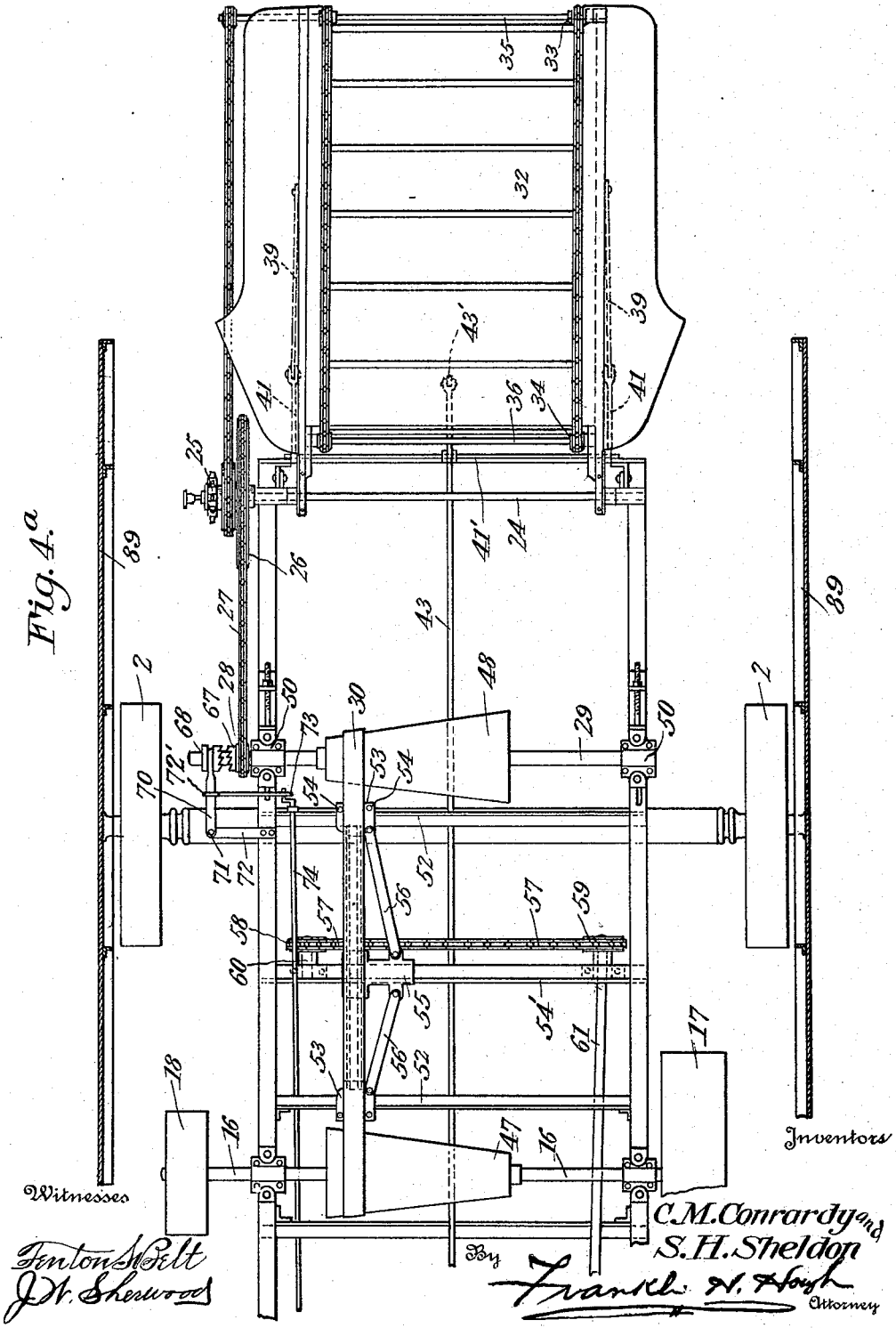

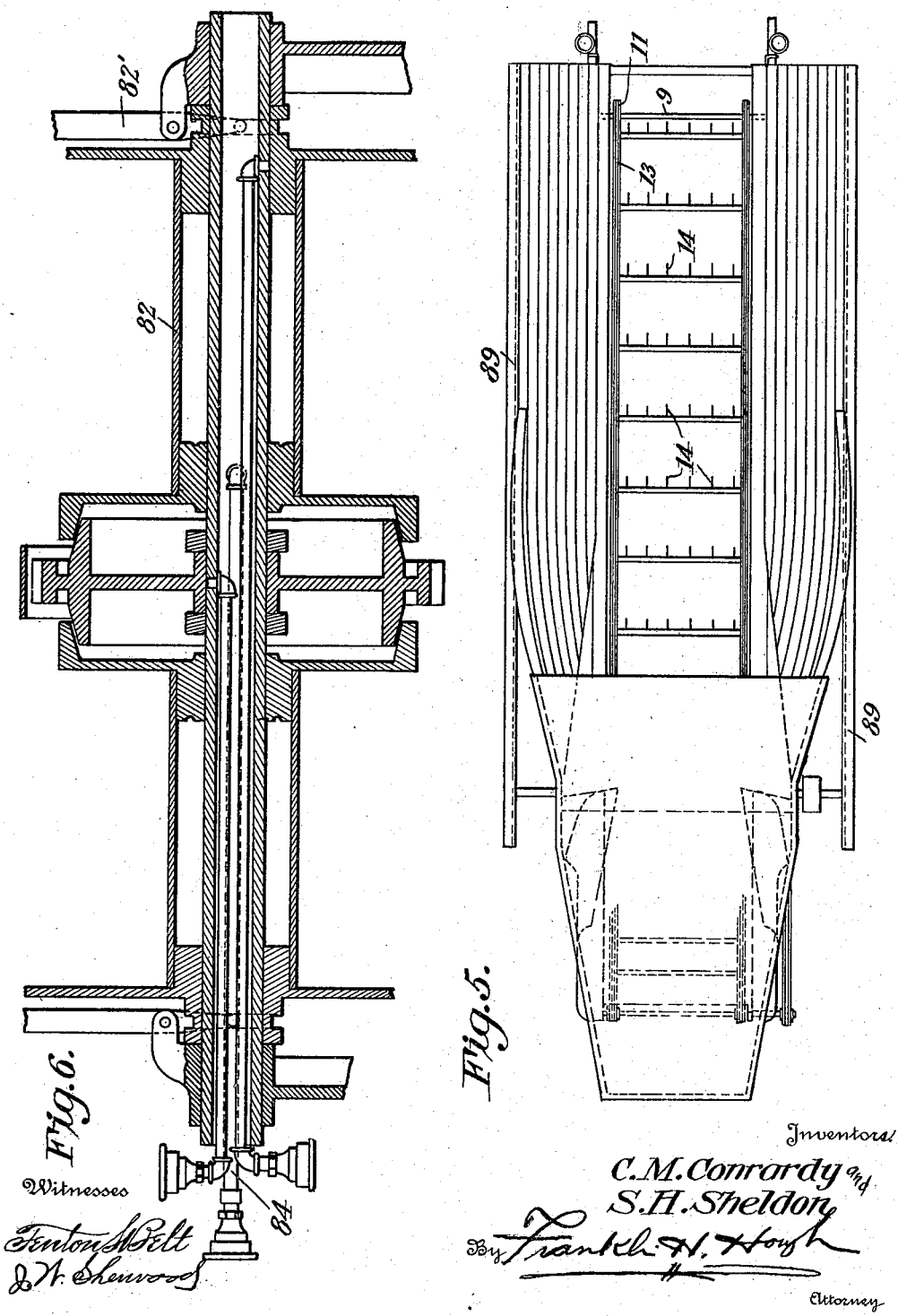

CASPER M. CONRARDY, OF WILLOWDALE, AND SAMUEL H. SHELDON, OF KINGMAN, KANSAS.

GRAIN FEEDING AND PITCHING MACHINE.

1,200,083.  Specification of Letters Patent.  Patented Oct. 3, 1916.

Application filed December 27, 1915. Serial No. 68,915.

*To all whom it may concern:*

Be it known that we, CASPER M. CONRARDY and SAMUEL H. SHELDON, citizens of the United States, residing, respectively, at Willowdale and Kingman, in the county of Kingman and State of Kansas, have invented certain new and useful Improvements in Grain Feeding and Pitching Machines; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in grain feeding and pitching machines and the object in view is to produce a simple and efficient apparatus of this nature so arranged that grain, either loose or bound, may be deposited upon the apparatus and fed forward to a threshing machine in connection with which the apparatus is designed to be used.

Our invention comprises various details of construction, combinations and arrangements of parts, which will be hereinafter fully described, shown in the accompanying drawings and then specifically defined in the appended claims.

We illustrate our invention in the accompanying drawings, in which:—

Figure 1:
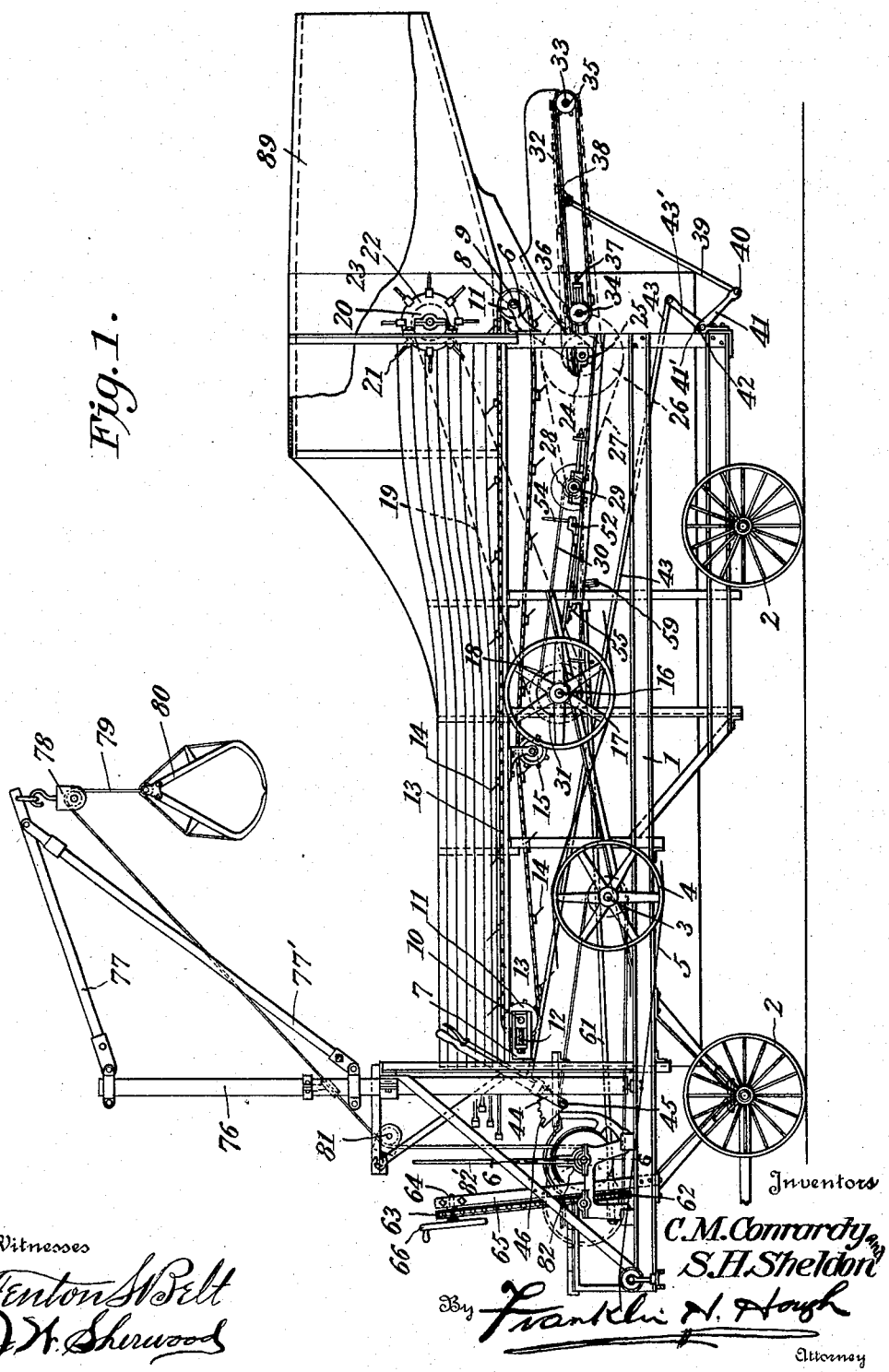
Figure 2:
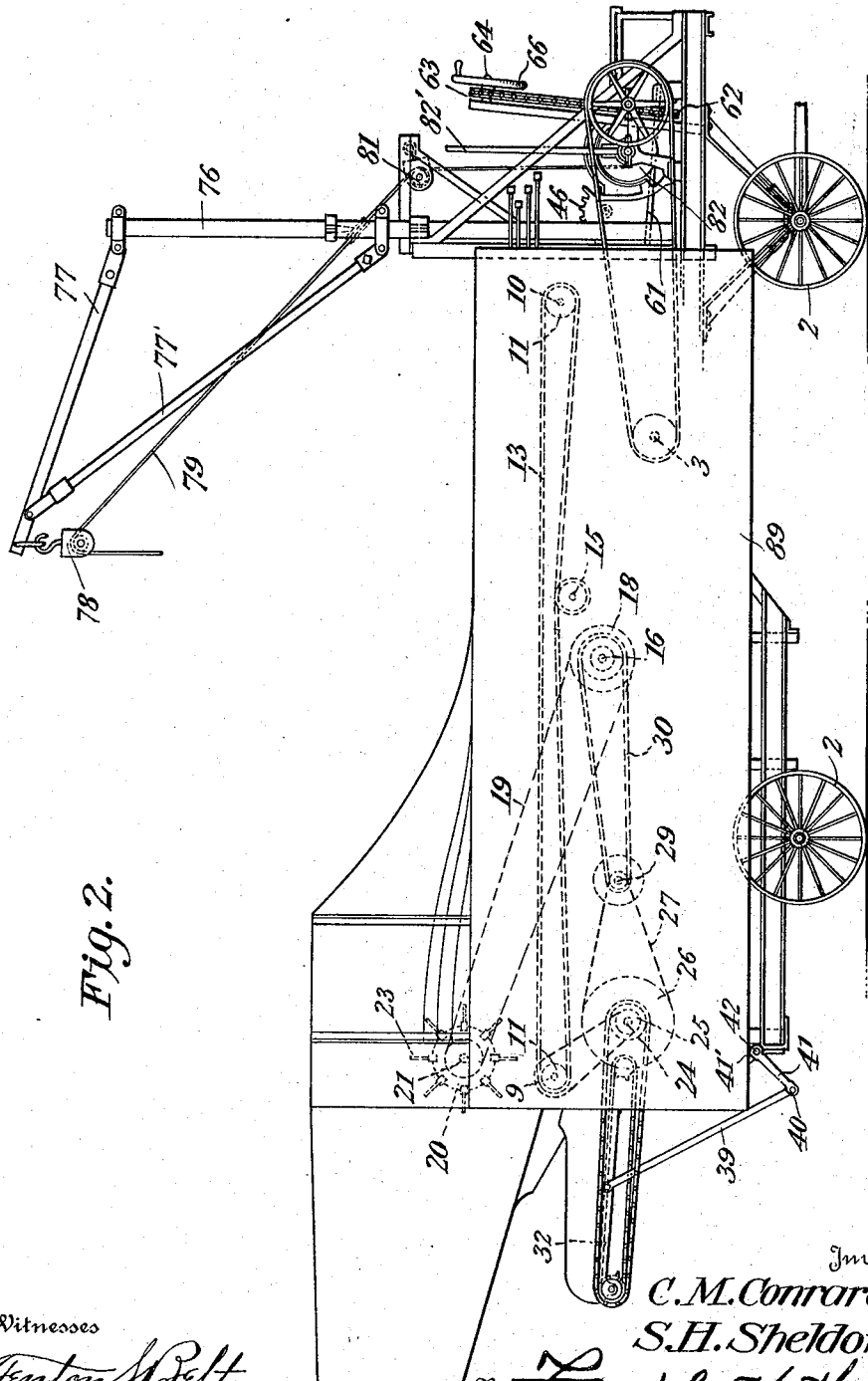
Figure 3:
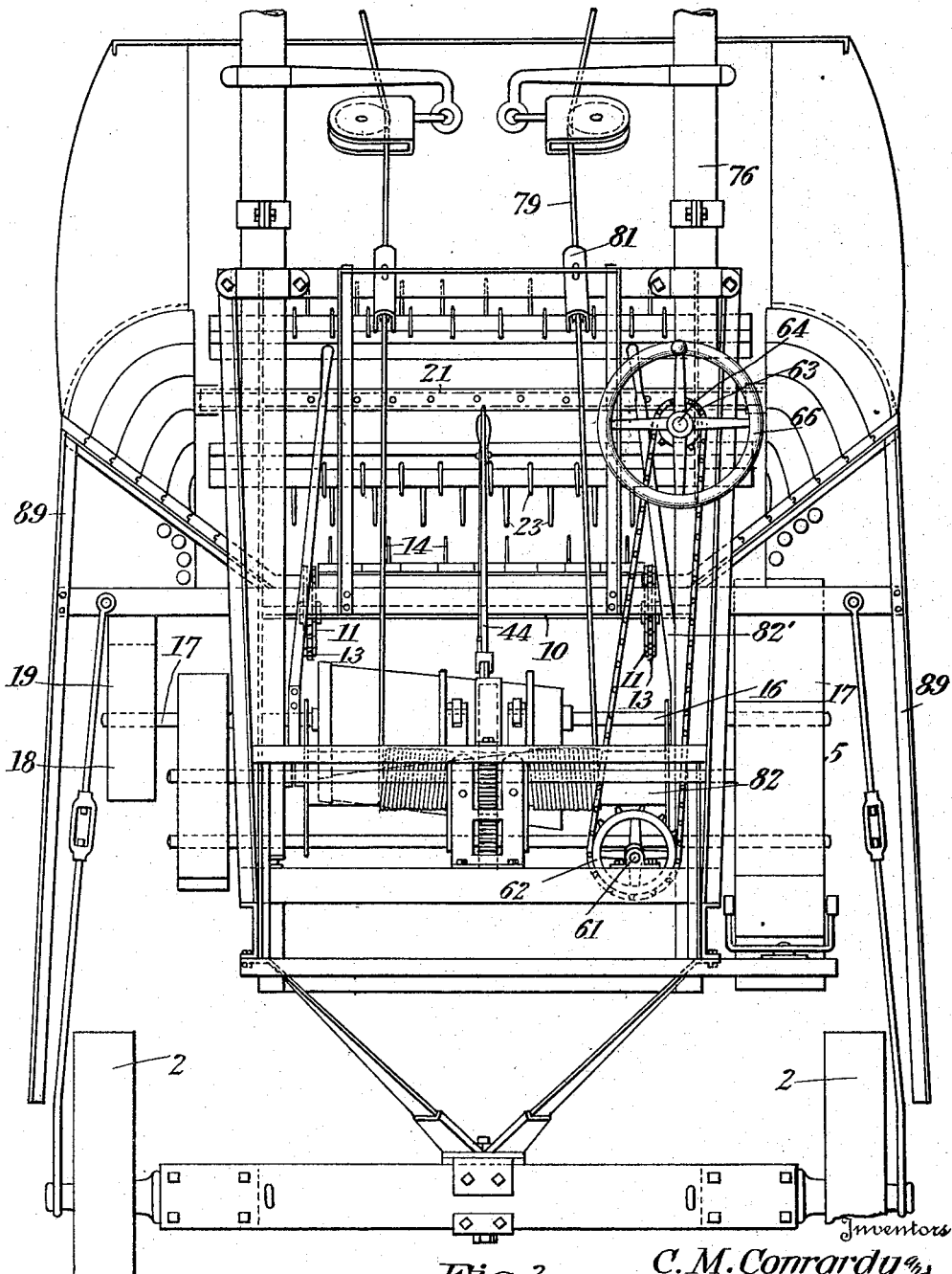

Figure 1 is a side elevation of the apparatus, partially in section. Fig. 2 is an elevation of the apparatus inclosed, parts being shown in elevation. Fig. 3 is a rear view. Fig. 4 is a top plan view of a portion of the apparatus, parts being shown in section. Fig. 4ª is a similar view showing in top plan view another part of the apparatus. Fig. 5 is a top plan view of a part of the frame of the apparatus, showing the guide walls and conveyer. Fig. 6 is a detail sectional view taken on line 6—6 of Fig. 1.

Reference now being had to the details of the drawings by numerals, 1 designates the frame of the apparatus mounted upon a truck having wheels 2, and 3 is a driving shaft having a wheel 4 fixed thereto which is driven from any suitable source of supply, not shown, through the medium of the belt 5. Mounted upon the frame are bracket arms 6 and 7 in which are mounted the shafts 9 and 10 respectively, carrying sprocket wheels 11, the shaft 10 being held in adjusted positions through the medium of the screw 12, shown in Fig. 1 of the drawings. An endless sprocket chain 13 passes about said sprocket wheel and has fingers 14 projecting at an angle therefrom and serving as a means for feeding the grain forward. Said sprocket chain passes over an intermediate sprocket wheel 15 held by bracket arms upon the frame of the apparatus and serves as an idler and takes up the slack in said chain.

A counter shaft 16 is journaled in suitable bearings in the frame and has a wheel 17 fixed thereto which is driven by means of the belt 5, and a second pulley, designated by numeral 18, is fixed to the shaft 16 and about which a belt 19 passes which also passes about a pulley 20 fixed to the shaft 21 and which latter also carries a cylinder 22 having radial fingers or teeth 23 thereon, which serve to disentangle the grain as it is fed forward upon the conveyer before leaving the latter.

A shaft 24 is mounted in suitable bearings in the frame and carries a pulley 25 and also a sprocket wheel 26, the latter serving as means for driving the shaft 24 by belted connections 27 with the pulley 28 upon the shaft 29, said shaft 29 being driven by belted connections 30 with a wheel 31 upon the shaft 16. A conveyer, designated by numeral 32, passes over the sprocket wheels 33 and 34, mounted respectively upon the shafts 35 and 36, the latter being held in adjusted positions by means of the screw 37. Said conveyer 32 has a frame about which it passes and to which a rod 39 is fastened which in turn is pivoted at 40 to the angle lever 41, pivoted at 42 upon the frame. A rod 43 is pivoted to one arm of the lever 41 and its other end to a lever 44 pivoted at 45 upon a part of the frame and a hand regulated pawl carried by the lever 42 engages the teeth of the segment 46, provided for the purpose of holding the conveyer 32 in different positions.

Referring to Fig. 4ª of the drawings there will be seen two reversely arranged, conical-shaped pulleys 47 and 48, the former mounted upon the shaft 16 and the latter upon the shaft 29 having adjustable bearings 50 mounted upon the frame. A belt 51 passes about said conical-shaped pulleys. Angle bars, designated by numeral 52 and forming a part of the frame, support the movable belt shifting blocks 53 from which rise the pins 54 upon either side of the belt, and intermediate the two angle bars 52 is a third angle bar 54 carrying a movable boxing 55 which is connected by braces 56 with the angle bar 54. A sprocket chain 57 passes about sprocket wheels 58 and 59, the former mounted upon a stub shaft 60 and the latter upon a rotatable shaft 61 journaled in suitable bearings upon the frame of the apparatus, said shaft having a sprocket wheel 62 fixed thereto, as shown in Fig. 4 of the drawings, and which has belted connection with a sprocket wheel 63 mounted upon the stub shaft 64 carried by the standard 65, shown in Fig. 1 of the drawings. A hand wheel 66 is fastened to the shaft 64 and affords means whereby the shaft 61 may be rotated for the purpose of shifting the belt to regulate the speeds of the rotary cones. The shaft 29 has a clutch collar 67 which carries the sprocket wheel 28 and about which the sprocket chain 27 passes, which latter also turns about the sprocket wheel 26. A clutch collar 68 is splined to the shaft 29 and is adapted to be thrown into and out of engagement with the collar 68 through the medium of the link 70 pivoted at 71 upon the arm 72. Said link 70 is connected through the medium of the rod 72 with the crank 73 upon the rod 74, which latter has an angled end 75, as shown in Fig. 4 of the drawings, affording means whereby the rod may be rocked for the purpose of throwing the clutch into and out of gear.

A derrick, designated by numeral 76, is pivotally mounted upon the frame and carries an adjustable boom 77 braced by the beam 77' and a pulley 78 is carried by the boom and about which a cable 79 passes which is connected to the fork 80, the cable 79 passing about a pulley 81 of the frame and adapted to wind about the drum 82 having spindle ends journaled upon the frame. The drum is thrown into and out of operative relation through the medium of suitable clutch mechanism regulated by the lever 82' upon the frame of the apparatus.

In order to lubricate the parts of the apparatus, oiling tubes 84, shown in Fig. 6 of the drawings, are provided. A suitable protecting casing 89 is fastened to the frame of the apparatus and covers the various parts and serves as a means for protecting the bearings of the wheels of the apparatus.

In operation, the grain, either loose or bundled, is hoisted by the rotary movement of the drum which has belted connection with the driving shaft 3 and may be swung over and deposited upon the conveyer 13 and fed forward upon the same where the movement of the grain is retarded by the rotary cylinder 20 having the fingers 23 thereon. The grain, as it falls upon the conveyer 32, is fed forward to the feeder of the threshing machine.

Through the medium of the conical-shaped pulleys and belted connection as shown, the speed at which it is desired to have the grain fed may be regulated, the belt upon the conical pulleys being regulated by the shifting of the same through the medium of the mechanism described.

What we claim to be new is:—

1. A grain feeding and pitching machine, comprising a frame, a driving shaft, counter shafts with reversely-arranged, conical-shaped pulleys thereon, belt connection between the pulleys, a boxing movable upon the frame, belt shifting members and connections between the same, said members connected to said boxing, a driving chain fastened to the connections of said belt shifting members, a sprocket chain and gear connections between the driving chain and the sprocket chain and operative connections from the driving shaft.

2. A grain feeding and pitching machine, comprising a frame, a driving shaft, counter shafts with reversely-arranged, conical-shaped pulleys thereon, belt connections between the pulleys, a boxing movable upon the frame, belt shifting members and connections between the same, said members connected to said boxing, a driving chain fastened to the connections of said belt shifting members, sprocket chain and gear connections between the driving chain and the sprocket chain, a rocking shaft upon the frame, operative connections from said driving shaft and clutch mechanism actuated by said shaft and adapted to throw one of said conical pulleys into and out of operation.

3. A grain feeding and pitching machine, comprising a frame, a driving shaft, counter shafts with reversely-arranged, conical-shaped pulleys thereon, belt connection between the pulleys, a boxing movable upon the frame, belt shifting members and connections between the same, said members connected to said boxing, operative connections from said driving shaft, a driving sprocket chain fastened to the connections of said belt shifting members, and means for operating the driving sprocket chain.

4. A grain feeding and pitching machine, comprising an adjustable frame, a rod secured to the adjustable frame, an angle lever pivoted on the frame and to which said rod is connected, lever-actuated mechanism for operating said angle lever, a driving shaft, counter shafts with reversely-arranged, conical-shaped pulleys thereon, belt connection between the pulleys, a boxing movable upon the frame, belt shifting members and connections between the same, said members connected to said boxing, a driving sprocket chain fastened to the connections of said belt shifting members, and means for operating the belt shifting and sprocket chains.

5. In a grain feeding and pitching machine, a frame, angle bars forming a part of said frame, belt-shifting blocks on two of said angle bars, a movable boxing on the intermediate angle bar, braces pivotally connecting said blocks and boxing, pins rising from said blocks to engage upon either side of a belt, parallel shafts, oppositely arranged cone pulleys on said shafts, a belt passed around said pulleys, adjustable bearings for one of said shafts, and a clutch, one member of which is carried by said last-named shaft.

6. In a device of the character stated, two reversely arranged conical-shaped pulleys, a shaft carrying one of said pulleys, a shaft having adjustable bearings and carrying the other pulley, a belt passed around said pulleys, shifting blocks having pins projecting therefrom, angle bars supporting said blocks, an angle bar intermediate said angle bars, a movable boxing carried thereby, braces connecting said boxing with said angle bar, sprocket wheels, a chain passing over said sprocket wheels, connected to said boxing, shafts for said sprocket wheels, a hand wheel and connections for rotating one of said shafts for shifting the belt to regulate the speed of said pulleys.

In testimony whereof we hereunto affix our signatures in presence of two witnesses.

CASPER M. CONRARDY.
SAMUEL H. SHELDON.

Witnesses:
CLYDE MURPHY,
D. L. STREITTZEN.

Copies of this patent may be obtained for five cents each, by addressing the "Commissioner of Patents, Washington, D. C."